US005815170A

United States Patent [19]

Kimura et al.

[11] Patent Number: 5,815,170

[45] Date of Patent: Sep. 29, 1998

[54] MEMORY CONTROL METHOD OF CHARACTER MULTIPLEXED BROADCAST RECEIVER

[75] Inventors: Tsuyoshi Kimura; Masahiko Nagata, both of Kanagawa, Japan

[73] Assignee: NEC Corporation, Tokyo, Japan

[21] Appl. No.: 755,411

[22] Filed: Nov. 22, 1996

[30] Foreign Application Priority Data

Nov. 29, 1995 [JP] Japan .................................... 7-311272

[51] Int. Cl.[6] ...................................................... G06F 13/16

[52] U.S. Cl. ........................................ 345/521; 455/186.1

[58] Field of Search .................................... 345/192, 521, 345/507, 514; 455/186.1, 150.1; 370/335, 342, 441

[56] References Cited

U.S. PATENT DOCUMENTS

| | | | |
|---|---|---|---|
| 4,686,706 | 8/1987 | Sakai | 455/186.1 |
| 5,010,406 | 4/1991 | Kawakami et al. | 348/468 |
| 5,668,805 | 9/1997 | Yoshinobu | 370/335 |

FOREIGN PATENT DOCUMENTS

| | | |
|---|---|---|
| 62-157488 | 7/1987 | Japan . |
| 63-1182 | 1/1988 | Japan . |
| 63-126376 | 5/1988 | Japan . |

*Primary Examiner*—Kee M. Tung
*Attorney, Agent, or Firm*—Scully, Scott, Murphy & Presser

[57] ABSTRACT

For an efficient memory use, a memory control method of the present invention of a character multiplexed broadcast receiver for controlling utilization of a data storing field (1) provided for storing data of pages of programs emitted in a character multiplexed broadcast comprises a step of checking when data of a page of a program are received whether the same data of the same page of the same program are already stored or not in any of blocks (1-1 to 1-n) of the data storing field (1) by searching an information table (3) comprising lines (3-1 to 3-l) sorted where is registered information of data stored in one of the blocks (1-1 to 1-n); a step of storing the data in an available block found by retrieving a status bit table (2) comprising a basic bit sequence (2-0), logic of its each bit indicating status of each corresponding block (1-1 to 1-n; a step of registering information of the data in the information table (3) by adding a new line; and a step of sorting the information table.

6 Claims, 11 Drawing Sheets

301: INFORMATION TABLE

| PROGRAM NUMBER | PAGE NUMBER | POINTER |
|---|---|---|
| 12 | 01 | 0000 |
| 11 | 03 | 0129 |
| 10 | 02 | 0200 |
| ⋮ | ⋮ | ⋮ |

MEMORY CONTROL METHOD OF CHARACTER MULTIPLEXED BROADCAST RECEIVER

BACKGROUND OF THE INVENTION

The present invention relates to a memory control method to be applied for a character multiplexed broadcast receiver of FM (frequency modulation) broadcast band.

In Japan, specifications of the character multiplexed broadcast are regulated by norms, hereafter to be called the FM character multiplex norms, stipulated in the Revision of MPT (Ministry of Posts and Telecommunications) Ordinances entitled "The Ordinance for Partial Amendment of the Rules for Radio Equipment (MPT-29)" and "The Revision of the Ordinance for Stipulating the Standard on Transmission for VHF Multiplexed Broadcasting Sounds and Characters (MPT-30)" (April 1994), and the Revision of Announcement entitled "The Case of Specifying Details of the Signal Sequence and the Character Code of Transmission for Mobile Receiving (MPT-461)" (August 1994), both revised according to the concerning descriptions in the Interim Report of the Telecommunications Technology Council for the Consultation No. 25 entitled "Technical Requirements for Signals to be Multiplexed in FM Broadcasting Radio Waves" (May 1993).

In the FM character multiplexed broadcast system, encoded character data are multiplexed in a spectrum gap of the ordinary FM sound broadcast wave, which are decoded in a receiver according to the FM character multiplex norms to be displayed on an LCD panel, for instance.

A user can select and display a desired program among programs, such as news, weather forecast, road information, etc., contained in the character data of the FM character multiplexed broadcast system.

Each program is always sent repeatedly but the repetition cycle is not defined in the FM character multiplex norms. So, the data of all programs should be maintained in a character data memory provided in the FM character multiplex receiver for displaying the selected program without delay, because it will take a certain response time when the selected program data are received after the selection waiting following repetitions.

FIG. 7 is a block diagram illustrating a basic configuration of the FM character multiplex receiver, comprising a FM tuner 101 for obtaining demodulated signals by amplifying and demodulating received FM radio waves, a data receiver 102 for extracting character data multiplexed in the demodulated signals, a RAM 104 for storing the character data, a character ROM 105 for storing font data, and a control unit 103 for controlling decoding and read-write of the character data stored in the RAM 104 for displaying font data of the character data on a display 106.

Referring to FIG. 7, the FM tuner 101 amplifies and demodulates received FM radio wave and output demodulated signals, from which the data receiver 102 extracts character data multiplexed therein. Storing the character data temporally in the RAM 104, the control unit 103 selects character data and decodes them according to the FM character multiplex norms for generating characters to be displayed on the display 106 with font data prepared in the character ROM 105.

FIG. 8 shows data structure of a page of the multiplexed character data defined in the FM character multiplex norms. Each program of the FM character multiplex emission consisting of several pages is stored in the RAM 104 page by page, that is by units of page data 72 of FIG. 8. One unit of the page data 72, having variable length, consists of certain number of packet data 71. The packet data 71 of 22 bytes' length, 4 bytes' prefix and 18 bytes' data, are the minimum unit composing the FM character multiplexed data to be emitted at a rate of one packet per 18 ms.

The maximum data length of a page, that is data of a field, is defined as 1146 bytes, corresponding to 63 packets and 12 bytes, and a number of pages of a program is defined to be within 2560, while average of the variable page data lengths is merely about 120 bytes, according to calculation from "300K bytes for 40 programs of 64 pages", described in "The Agreement Concerning Operation of the FM Multiplexed Broadcast (BTA R-002)", Broadcast Technical Agency, enacted March 1995, hereafter called the operational agreement.

There are similar systems with the FM character multiplex broadcast, the TV character multiplex system or the RDS (Radio Data System).

As for the TV character multiplex receiver and its memory control method, there are some proposals disclosed in Japanese patent applications laid open as Provisional Publications No. 001182/'88, 126376/'88 and 157488/'87.

Because the FM character multiplex system is to be compact compared to the TV character multiplex system, it should be composed of a lower speed CPU and a smaller RAM for data storing, and further, data are transmitted more slowly than the TV character multiplex system. So, when aimed data are once mis-caught, it costs a delayed response for the program selection.

And compared to the RDS, a more efficient utilization of the data storing memory is needed for storing as many as possible in the memory of larger amount of data to be handled than the RDS.

Dealing with these problems, several devices have been proposed for the memory control for the FM character multiplex system.

FIG. 9 is a block diagram illustrating data structure and their flows in a prior art of memory control for the FM character multiplex system. In the prior art, hereafter called the first prior art, the data receiver 102 of FIG. 7 comprises a receiving buffer 201 for buffering received FM character multiplexed data DF. Once buffered, the received data DF of variable length are stored byte by byte sequentially from their top in a data storing field 401 provided in the RAM 104. For managing stored data DFM in the data storing field 401, there is provided an information table 301 described of program number, page number and data address of the stored data DFM.

Now, the first prior art is described referring to the block diagram of FIG. 9 and a flowchart of FIG. 10 illustrating processing steps therein. The processing steps are grouped into two routines, an interrupt routine and a main routine. The interrupt routine is performed according to demands arising every 9 ms, asynchronously independent of the main routine.

The FM character multiplex data are beforehand described to be emitted added with parity data at the rate of a packet par 18 ms, which are generally decoded and error-corrected through an LSI chip outputting a data packet laterally corrected referring to parity bits in the same packet and also a data packet longitudinally corrected referring to parity packets provided for each frame of 272 packets, in turn with interval of 9 ms. This is the reason the interrupt routine is performed in a cycle of 9 ms. Generally, only the laterally corrected data are used and the longitudinally corrected data are reserved for the data which can not be revised by the lateral corrections.

Returning to FIG. 10, every received data DF of the FM character multiplex emission are taken in the receiving buffer 201 at step P1 of the interrupt routine for the first.

Then, in the main routine, it is checked wether there are already stored the same data in the data storing field 401 with the received data DF in the receiving buffer 201, by referring to the information table 301, at step P2. In case there is not the same data (step P3), the received data DF are transferred from the receiving buffer 201 to the data storing field 401 and information concerning the data DFM thus stored is registered in the information table 301 (step P4). In case it is checked at step 3 that there are already stored data corresponding to the received data DF and also decided at step P5 that contents of the data are revised, the received data DF are, in the same way, transfered from the receiving buffer 201 to the data storing field 401 and information concerning the stored data DFM is registered in the information table 301 at step 6, and further at step 7, the corresponding data previously stored and now found unnecessary are overwritten with following data up-shifted in order, for making rooms in the data storing field 401.

Therefore, in the memory control method as the prior art above described of storing data byte by byte sequentially from the top of the memory, a block removal of stored data DFM becomes necessary in case data length of the received data DF is longer than and impossible to be replaced with that of corresponding data previously received, because of scenario revision of the program, for example. This block removal of the stored data DFM costs increase of times for processing received data DF in the receiving buffer 201, where are still arriving data at a rate of a packet par 9 ms. So, the receiving buffer 201 is easy to be filled, resulting in an overflow of the received data DF.

As beforehand described, each program is emitted repeatedly in the FM character multiplex broadcast. However, as the repeating interval is not regulated, data to be stored should be caught surely at the first chance and verified before storing whether they are or not the same repetition of data already stored. Since this verification takes several 10 ms, it can not be performed at real time following packets arriving every 9 ms. This is the reason the received data DF is once stored in the receiving buffer 201 before transferring necessary data to the data storing field 401 through the verification. As for the receiving buffer 210, at least 2292 bytes are desired, two times of the maximum data length 1146 bytes of a field for each of the data receiving and the transfer data reservation, even the larger capacity giving the higher processing efficiency.

Now, another prior art, hereafter called the second prior art, of the memory control method for character multiplex data is described, wherein the data storing field 401 is controlled divided into blocks each having a space of 1146 bytes, that is, the maximum data length of a field defined in the FM character multiplex norms. Each received page of the FM character multiplexed data are stored without any regard to their data length in one block of 1146 bytes divided of the RAM 104.

By the memory control method of this prior art, a large memory of 3M bytes is needed for storing maximum number 2560 of programs. The higher battery consumption because of the larger memory in a portable FM character multiplex receiver results in the shorter available time. In the other words, memory efficiency is made very low by allocating, to every block of 1146 bytes, only 120 bytes, namely average data length of a page beforehand calculated according to the operational agreement.

FIG. 11 is a block diagram illustrating memory structure of a still another prior art of memory control method for the FM character multiplexed data, called the third prior art. In the third prior art, the data storing field 401 provided in the RAM 104 is divided into n blocks 41-1 to 41-n for storing the received data DF in each thereof, each block length being optional. For controlling the stored data DFM in the data storing field 401, there is further provided an information table 801.

Each of lines 81-1 to 81-n in the information table 801 corresponding to each of the blocks 41-1 to 41-n has information of program number, page number and utilization indicator of the corresponding stored data DFM, enabling to be referred to for usage acquisition of each block.

Now, the third prior art is described in connection with FIG. 11 and a flowchart of FIG. 12 illustrating its processes.

For data storing, an available block retrieval is started from the first block 41-1 (step P11). By reading the utilization indicator from the corresponding line 81-1 of the information table 801 (step P12), utilization of the block is checked (step P13). When it is used, the retrieval process is transferred to a next block 41-2 (step P14), otherwise a data write is performed and information of the data is registered there in the line 81-1 of the information table 801.

In the third prior art of memory control, an available block is retrieved block by block for each data write of the received data DF. So, there is a problem that retrieval time increases in proportion of number of blocks.

Further, since identity of the received data DF must be checked for not restoring the same data, taking more times for data receiving and storing. So, a buffer memory is indispensable and it is as much probable as the first prior art that the received data DF might overflow of the buffer memory, resulting also in a slow response to the user's program selection.

As heretofore described, in a memory control method for the character multiplexed data of storing received data byte by byte from top of a data storing field such as the first prior art, a block removal of stored data is needed when data length of a stored program becomes longer because of a scenario revision, for instance, increasing times for processing the received data in a buffer memory. So, there is a problem that the received data are probable to overflow from the buffer memory.

In another memory control method of preparing blocks each for storing data of each page such as the second prior art, there is a problem that a large memory space corresponding to maximum number of pages of maximum data length should be prepared. Its power dissipation limits available time of battery driven receivers, because of pretty low efficiency of the large memory for storing a little page data on the average.

In still another memory control method of preparing blocks of various lengths such as the third prior art, there is a problem of time increase proportional to number of blocks because of available block retrieval for each received data. Together with necessity of the identity verification, it needs a buffer memory for the temporal data storing as well as a further time increase for processing the received data, resulting in delayed response of selected display caused by data overflows.

SUMMARY OF THE INVENTION

Therefore, an object of the present invention is to provide a memory control method for the FM character multiplexed broadcast receiver wherein both the available block retrieval and the identity verification are performed in a sufficiently short time, needing neither data removal nor buffer memory.

In order to achieve the object, a memory control method of the present invention of a character multiplexed broadcast receiver for controlling utilization of a data storing field of a memory provided for storing data of pages of programs emitted in a character multiplexed broadcast; comprises:

- a step of checking when data of a page of a program are received whether the same data of the same page of the same program with said data of said page of said program are already stored or not in any of plurality of blocks provided in the data storing field by searching an information table comprising a plurality of lines sorted, in each of said plurality of lines being registered information of data stored in one of said plurality of blocks;
- a step of storing said data of said page of said program in available one of said plurality of blocks found vacant by retrieving a status bit table comprising a basic bit sequence, logic of each bit of said basic bit sequence indicating an utilization status of corresponding each of said plurality of blocks, in case that the same data of the same page of the same program with said data of said page of said program are checked not stored at said step of checking;
- a step of registering information of said data of said page of said program, stored at said step of storing, in said information table by adding a new line to said plurality of lines; and
- a step of sorting said information table according contents of said plurality of lines added with said new line.

Therefore, both the available block retrieval and the identity verification are performed in a sufficiently short time, needing neither data removal nor buffer memory in the invention.

DESCRIPTION OF THE DRAWINGS

The foregoing, further objects, features, and advantages of this invention will become apparent from a consideration of the following description, the appended claims, and the accompanying drawings following in which the same numerals indicate the same or the corresponding parts.

DETAILED DESCRIPTION OF THE PREFERRED EMBODIMENTS

Figure 1:
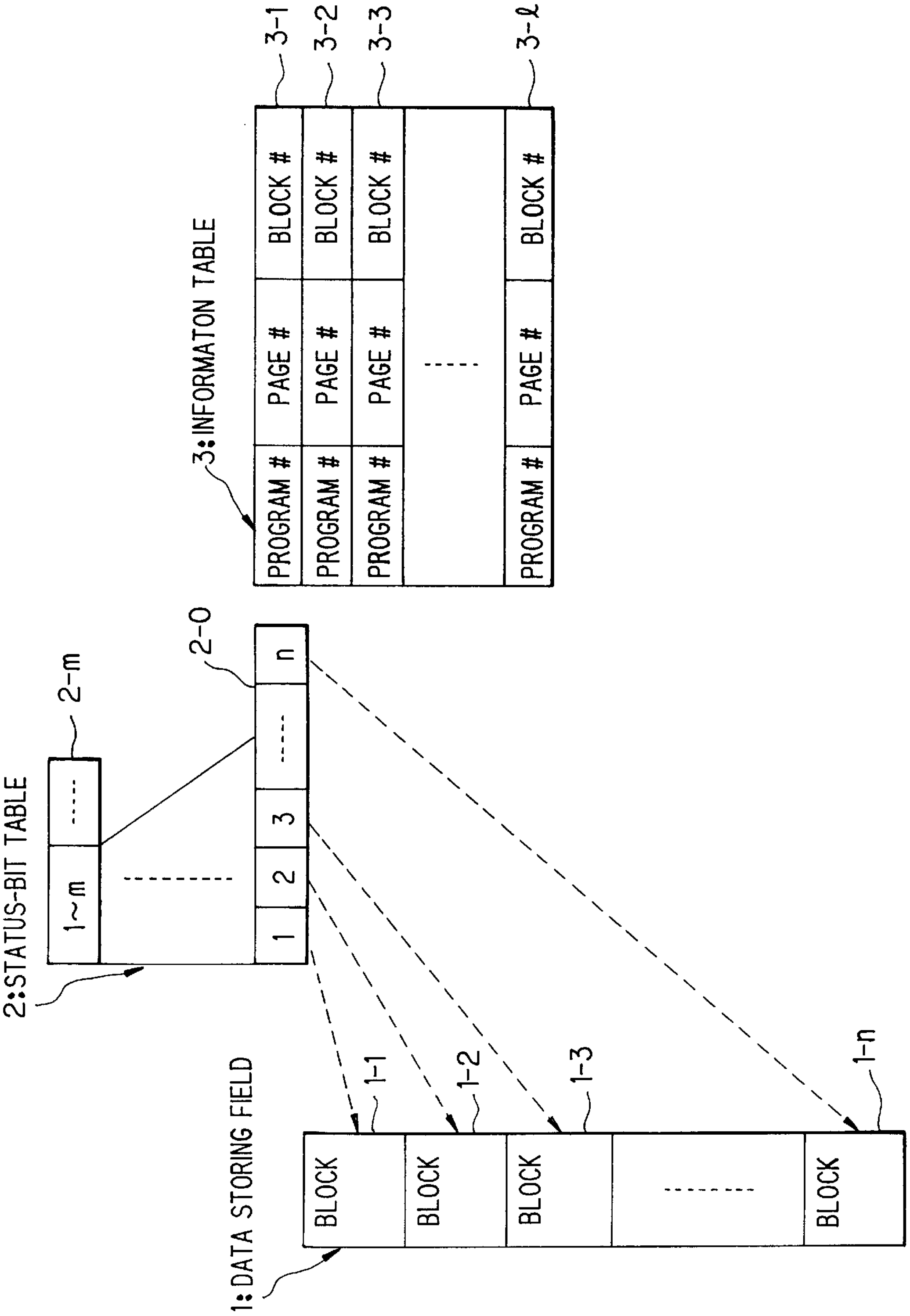
FIG. 1 is a block chart illustrating memory structure of an embodiment of the present invention.

Now, referring to the drawings, embodiments of the present invention are described.

Figure 7:
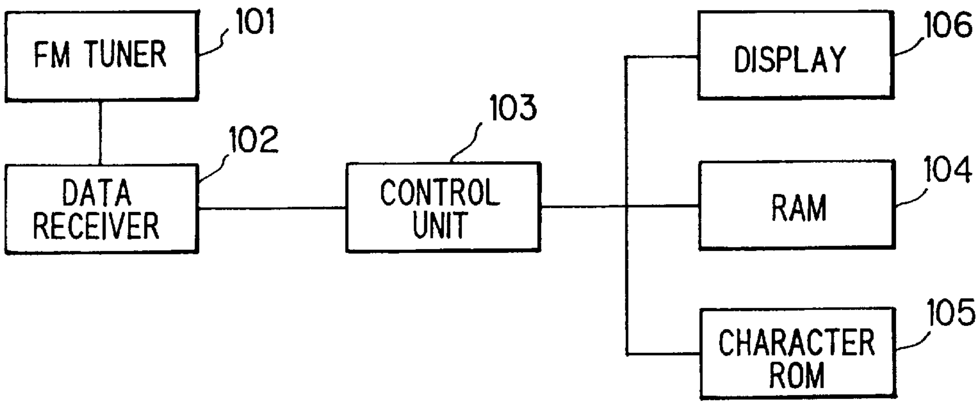
FIG. 7 is a block diagram illustrating a basic configuration of the FM character multiplex receiver.
Figure 8:
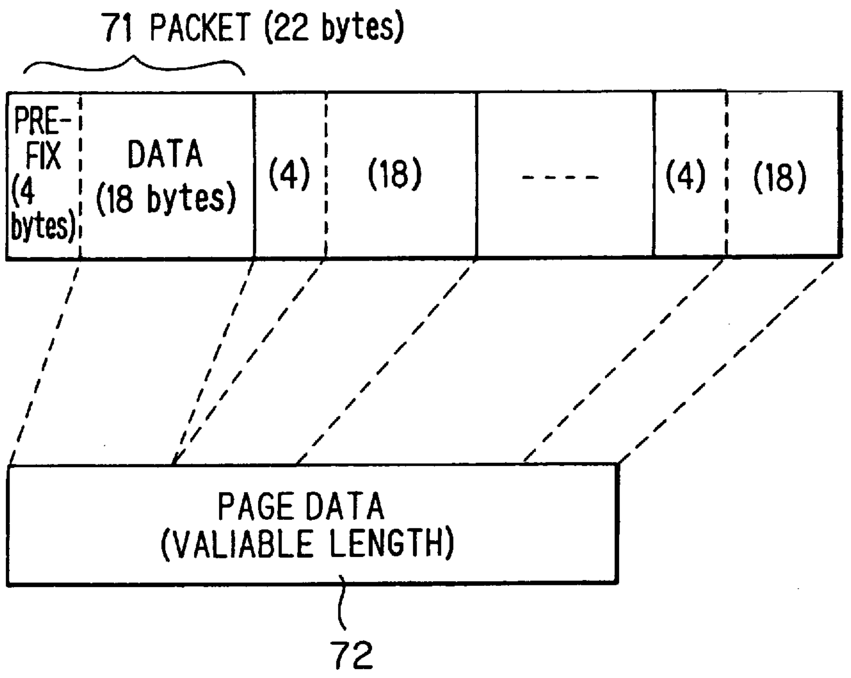
FIG. 8 shows data structure of a page of the multiplexed character data defined in the FM character multiplex norms.
Figure 9:
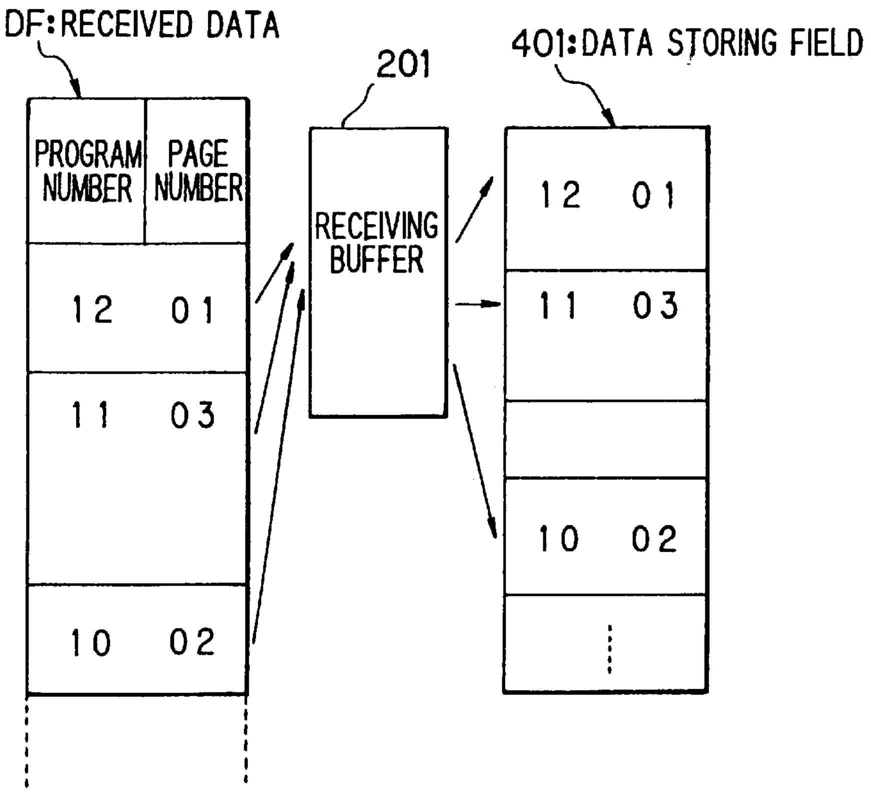
FIG. 9 PRIOR ART
FIG. 9 is a block diagram illustrating data structure and their flows in a prior art of memory control for the FM character multiplex system.

FIG. 1 is a block chart illustrating memory structure of an embodiment of the present invention, wherein comprised;

a data storing field 1 provided in the RAM 104 of FIG. 7, which is divided into a plurality of blocks 1-1 to 1-n of a fixed length, 128 bytes for example, for storing the received data DF in each thereof, a status-bit table 2 for indicating usage of each of the plurality of blocks 1-1 to 1-n in the data storing field 1, and information table 3 for administrating stored data DFM in each of the plurality of blocks 1-1 to 1-n.

The status-bit table 2 consists of a basic bit sequence and preferably one or more upper bit sequences. In FIG. 1, there is illustrated an example of the basic bit sequence 2-0, of which each bit indicates usage of corresponding each of the plurality of blocks 1-1 to 1-n by logic 0 when available and by logic 1 when occupied, and a m-th upper bit sequence 2-m, of which each bit indicates logical product of each word, eight bit for an example, of the (m−1)-th upper bit sequence 2–(m−1), m being a positive integer and 0-th upper bit sequence being the basic bit sequence 2-0 itself.

The information table 3 consists of lines 3-1 to 3-l, each having information of program number and page number of data DFM stored in one of the plurality of blocks 1-1 to 1-n, together with its block number. In retrieval, the information table 3 is to be sorted in ascending order of the program number and the page number.

Figure 4:
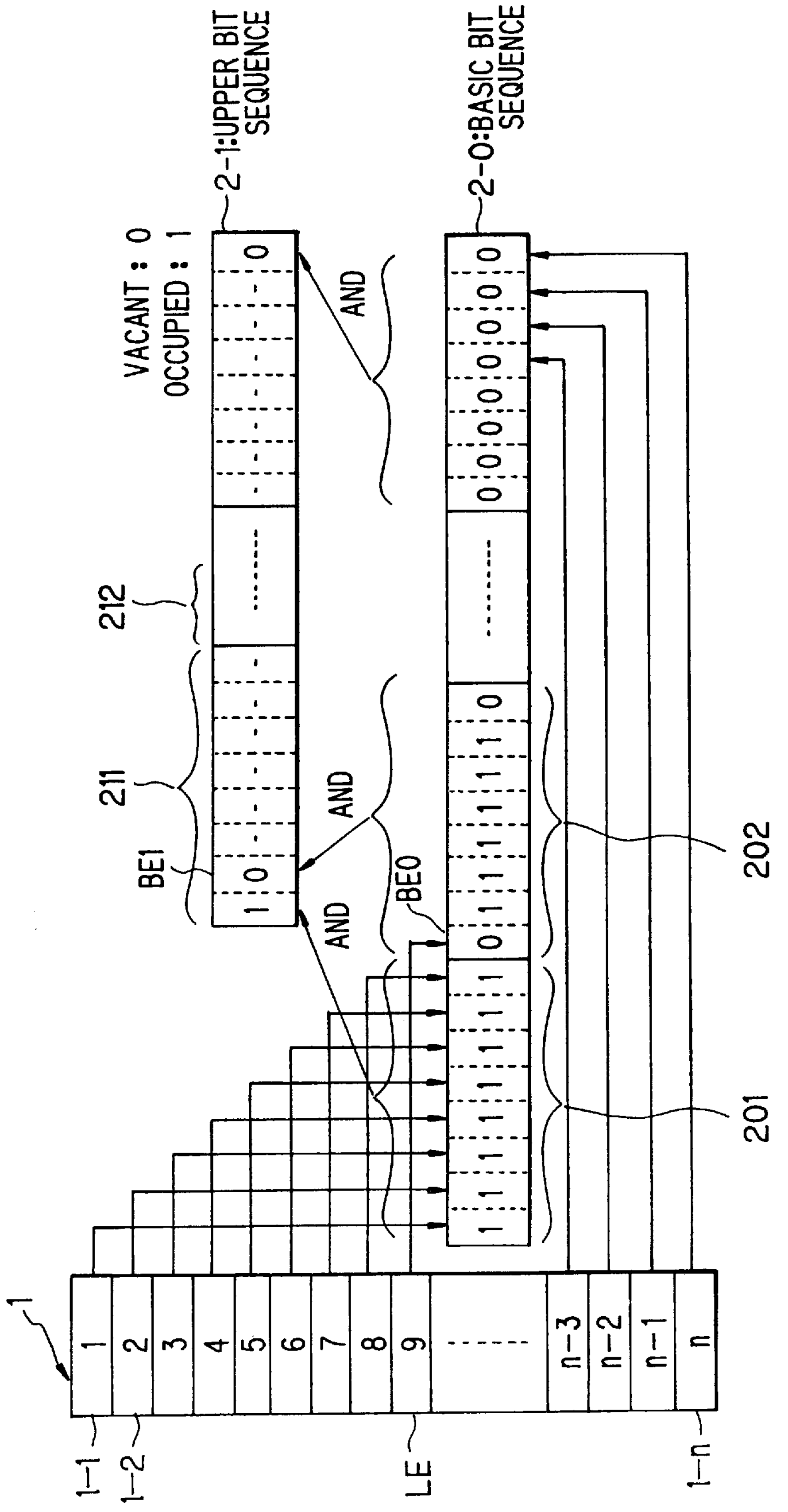
FIG. 4 is a block chart illustrating relation between the data storing field 1 and the status-bit table 2 having an upper bit sequence 2–1 together with a basic bit sequence 2–0.

Here, the embodiment is described in connection with an example wherein each of the plurality of blocks 1-1 to 1-n has 128 bytes' length and the status-bit table 2 has preferably one upper bit sequence, details of which is illustrated in FIG. 4. The reason is as follows.

In the operational agreement beforehand mentioned, three service levels are defined for the FM character multiplex broadcast service in accordance with its information density, and the service level 1 is prepared for information density of "about 300K bytes for 40 programs each having 64 pages". So, the average data length of one page is 120 bytes≅300 Kbytes/(40×64).

Figure 6:
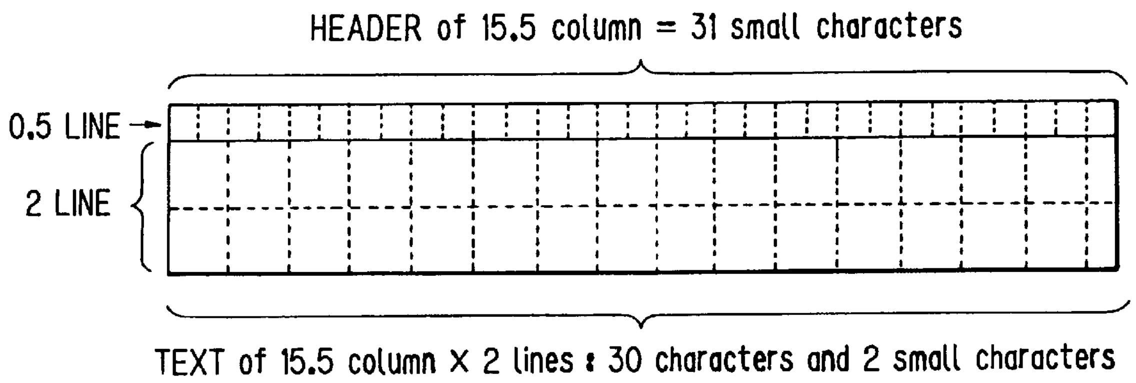
FIG. 6 shows a display exampled in the operational agreement for the FM character multiplex receiver.

FIG. 6 shows a display exampled in the operational agreement for the FM character multiplex receiver having 2.5 lines×15.5 columns. It means 63 japanese characters, namely 126 bytes.

Considering these descriptions and convenience for addressing, memory space of 128 bytes=$2^7$ is assigned for each of the blocks 1-1 to 1-n.

When a memory space of 300K bytes, that above described, is to be prepared for the data storing field 1, it corresponds 2400 blocks of 128 bytes.

TABLE 1

| No. of Blocks | 250 | 500 | 1000 | 2000 | 4000 | 8000 |
|---|---|---|---|---|---|---|
| no upper bit sequence | 2.49 ms | 4.99 ms | 9.99 ms | 19.99 ms | 39.99 ms | 79.99 ms |
| 1 upper bit sequence | 0.40 ms | 0.71 ms | 1.41 ms | 2.58 ms | 5.08 ms | 10.00 ms |
| 2 upper bit sequences | 0.20 ms | 0.24 ms | 0.32 ms | 0.48 ms | 0.79 ms | 1.41 ms |
| 3 upper bit sequences | 0.25 ms | 0.25 ms | 0.26 ms | 0.28 ms | 0.32 ms | 0.40 ms |
| 4 upper bit sequences | 0.33 ms | 0.33 ms | 0.33 ms | 0.33 ms | 0.33 ms | 0.34 ms |

TABLE. 1 shows calculation time t(B, s) needed for retrieving an available block making use of the status-bit table 2 of FIG. 1, calculated for models having 250 blocks to 8000 blocks and 0 to 4 upper bit sequences, according to following equation assuming the retrieval is performed by an assembler program on a 8-bit microcomputer chip of 5 MHz.

$$t(B, s)=(B\times 8^{-s}+8s)\times T$$

where B and s represent number of the blocks and number of upper bit sequences (0 to 4) respectively, T being an average time needed for verifying a block.

Referring to TABLE. 1, two or three upper bit sequences are seen to be preferably prepared for 2400 blocks. In practice, however, the most upper bit sequence can be omitted since a word of eight bits in the upper bit sequences can be examined at once by an eight-bit microcomputer. So, one upper bit sequence is provided in the example taking the memory space in consideration.

Figure 2:
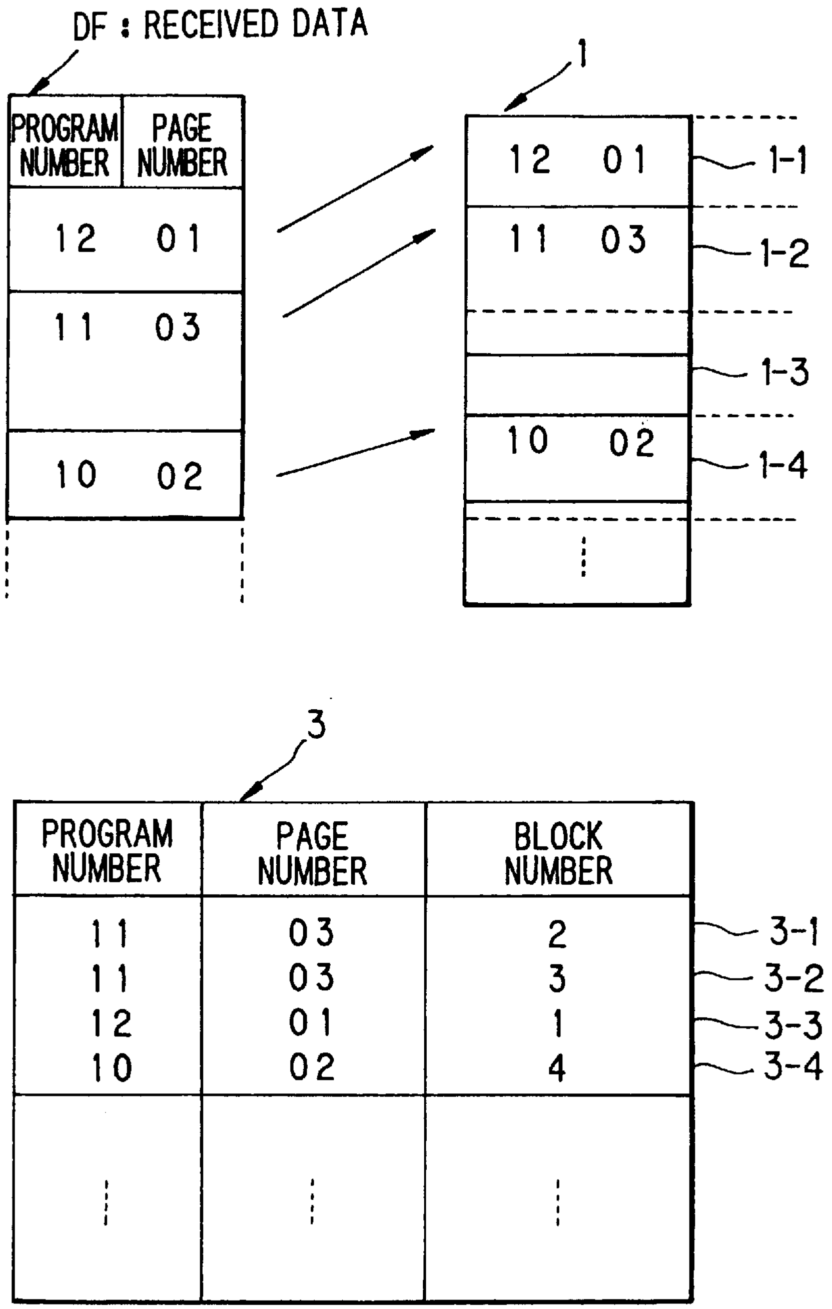
FIG. 2 is a block chart illustrating an example of the received data DF to be stored in the data storing field 1 and their information stored in the information table 3.
Figure 3:
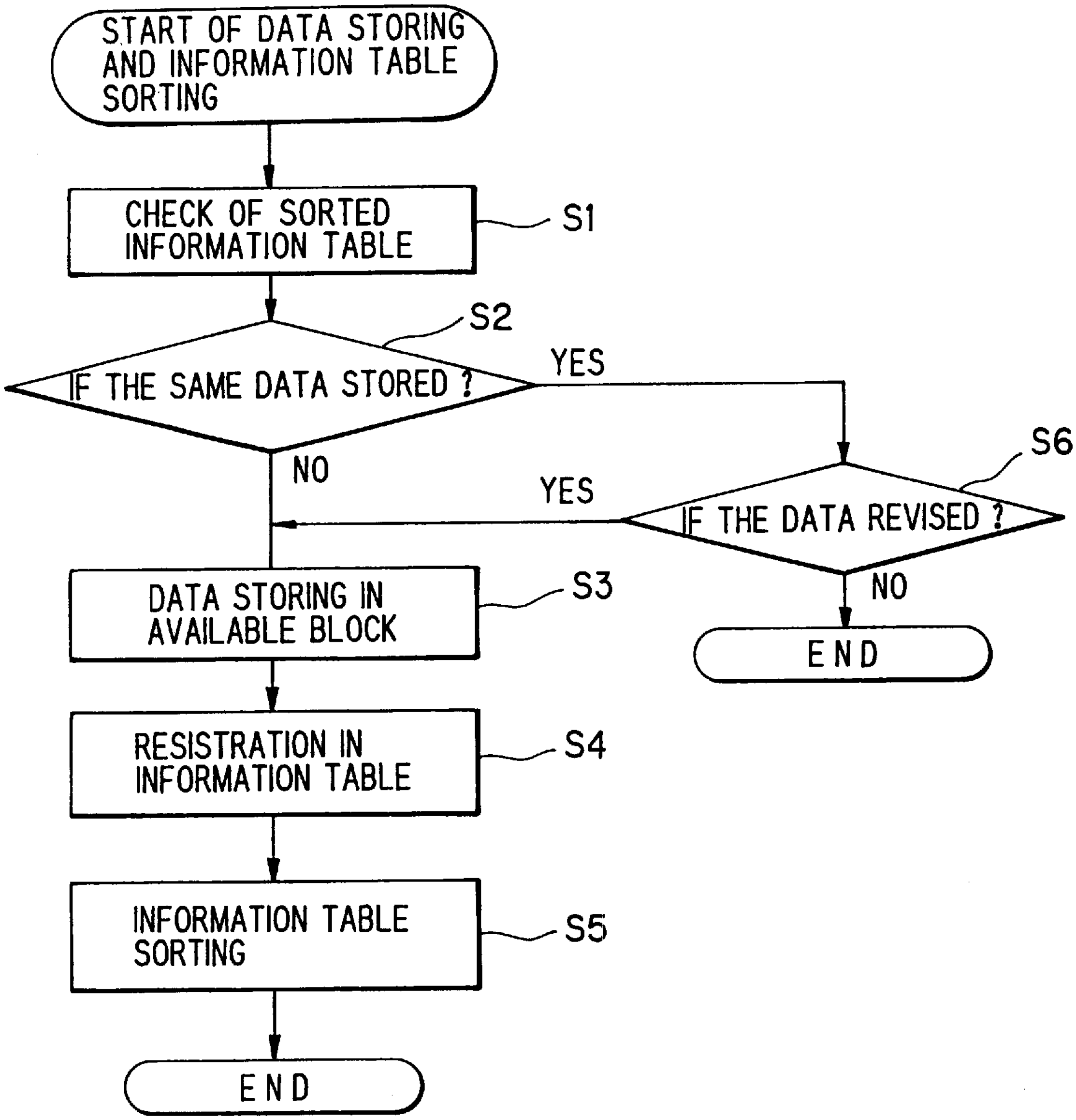
FIG. 3 is a flowchart illustrating the retrieval processes making use of the status-bit table 2 of FIG. 1.

Now, memory control method of the embodiment is described referring to FIG. 1, a block chart FIG. 2 illustrating an example of the received data DF to be stored in the data storing field 1 and their information stored in the information table 3, and a flowchart of FIG. 3 illustrating the retrieval processes.

In FIG. 2, data of three pages of the received data DF are already stored in the blocks 1-1 to 1-4, numbered with 1 to 4, and their information, program number, page number and block number, for example, is registered and sorted in lines 3-1 to 3-4 of the information table 3.

When data DF of a page are received, it is checked whether data of the same page of the same program are already registered or not in the sorted information table 3 (steps S1 and S2 of FIG. 3). In case not registered, the new-coming data DF are stored in an available block LE by retrieving corresponding vacant bit BE in the status-bit table 2 (step S3), and information of the new-coming data DF is added on a next line 3–5 of the information table 3 (step S4). Then the information table 3 is sorted in order of the program number and the page number (step S5), control step going to END for returning to START.

In case data of the same page of the same program are already registered, it is checked whether the received data DF are revised or not (step 6). When revised, the control step returns to the step S3, and otherwise goes to END.

In the control steps above described, steps of the available block retrieval and the data storing are accomplished with priority in the interrupt routine performed in the interval of 9 ms, and steps unnecessary to be performed at high-speed of sorting the information table 3 are processed in the main routine.

Figure 5:
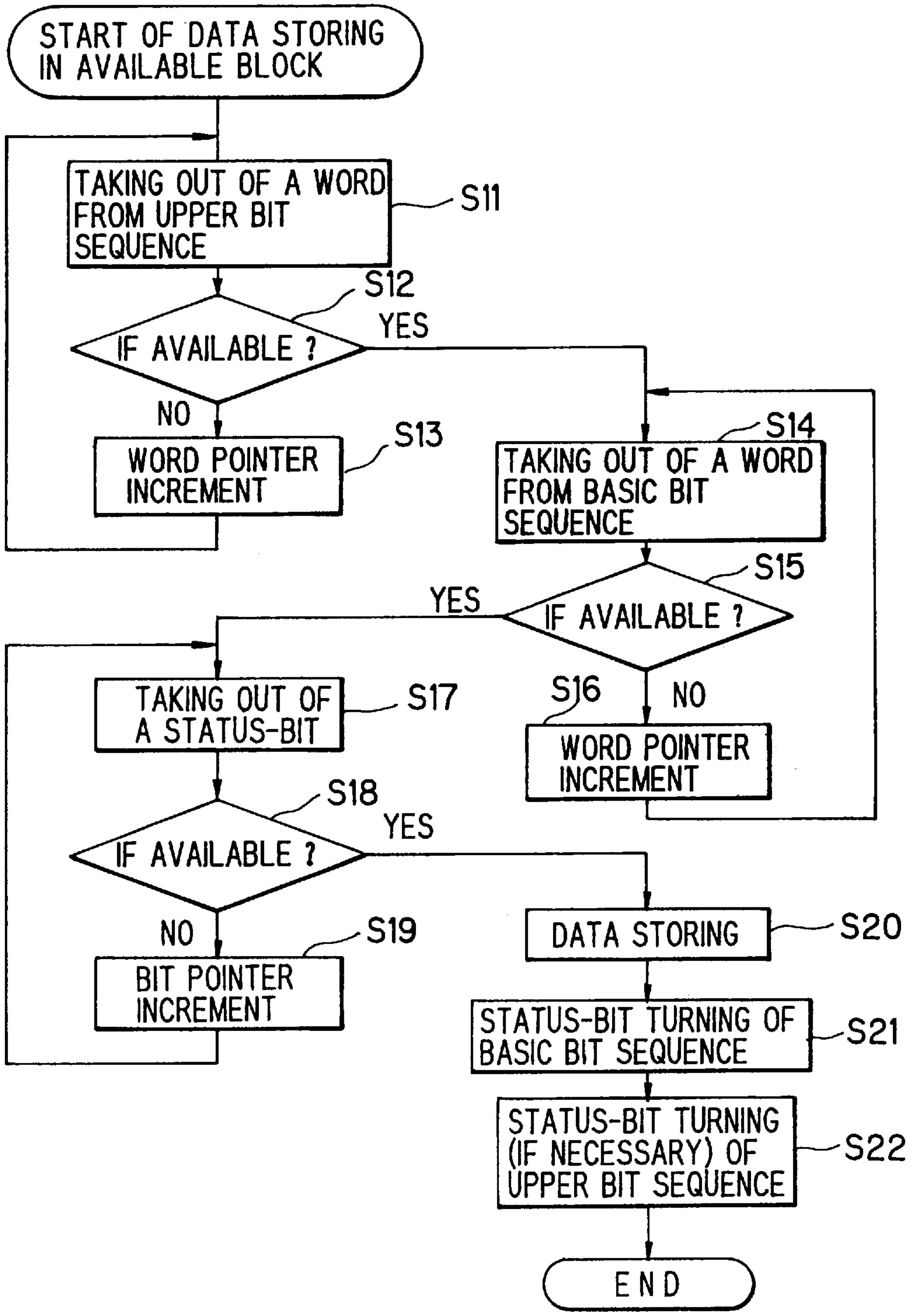
FIG. 5 is a flowchart illustrating processing steps in the available block retrieval at step S3 of FIG. 3.

FIG. 4 is a block chart illustrating relation between the data storing field 1 and the status-bit table 2 having an upper bit sequence 2-1 together with a basic bit sequence 2-0, and FIG. 5 is a flowchart illustrating processing steps in the available block retrieval at step 3 of FIG. 3 to be performed at high-speed in the interval of 9 ms making use of the status-bit table 2.

In the status-bit table 2 of FIG. 4, there is illustrated a vacant bit BE0 of the basic bit sequence 2-0 indicating an available block LE of the data storing field 1. Another vacant bit BE1 in the upper bit sequence 2-1, representing logical product of bit logic of its corresponding word 202, indicates existence of the vacant bit BE0 in the word 202.

Referring to FIG. 5, the retrieval and the data storing processes at step S3 of FIG. 3 are described.

A word 211 of the upper bit sequence 2-1 is taken out for the first (step S11) to be examined (at step S12) whether there is a vacant bit (BE1 for example) therein or not. When the word is occupied, indicated by hexadecimal 'FF', next word is taken out (through step S13). When it is found there is a vacant bit, its corresponding words 201 to 208 of the basic bit sequence 2-0 are similarly taken out and examined word by word (at steps S14 to S16) and finally a vacant bit BE0 is specified (at steps S17 to S19) for storing the received data DF in an available block corresponding thereto (at step S20), the vacant bit BE0 turned to logic '1' (at step S21), and also the vacant bit BE1 when the word 202 becomes 'FF' (at step S22).

When the received data DF are the revised data of that already stored, a bit or bits corresponding to the block(s) having data previously stored are turned to logic '0' together with corresponding bit, if necessary, in the upper bit sequence 2-1.

Thus, by making use of the data storing field 1 consisting of the plurality of blocks 1-1 to 1-n each having 128 bytes' memory space and the status-bit table 2, an available block can be retrieved in a 0.5 ms in the embodiment.

As for the information table 3, one line can be composed of four bytes, one byte for program number, one byte for page number and two bytes for block number. When a memory space of the 300K bytes is to be prepared for storing data of 2400 pages in 2400 blocks of 128 bytes, it is sufficient for the information table 3 with memory space of 9600 bytes=2400×4 bytes, which can be sorted in about 1 ms.

Thus, there can be provided a memory control method for the FM character multiplexed broadcast receiver wherein both the available block retrieval and the identity verification are performed in a sufficiently short time, needing neither data removal nor buffer memory, in the present invention.

What is claimed is:

1. A memory control method of a character multiplexed broadcast receiver for controlling utilization of a data storing field of a memory provided for storing data of pages of programs emitted in a character multiplexed broadcast; comprising:

a step of checking when data of a page of a program are received whether the same data of the same page of the same program with said data of said page of said program are already stored or not in any of plurality of blocks provided in the data storing field by searching an information table comprising a plurality of lines sorted, in each of said plurality of lines being registered information of data stored in one of said plurality of blocks;

a step of storing said data of said page of said program in available one of said plurality of blocks found vacant by retrieving a status bit table comprising a basic bit sequence, logic of each bit of said basic bit sequence indicating an utilization status of corresponding each of said plurality of blocks, in case that the same data of the same page of the same program with said data of said page of said program are checked not stored at said step of checking;

a step of registering information of said data of said page of said program, stored at said step of storing, in said information table by adding a new line to said plurality of lines; and a step of sorting said information table according contents of said plurality of lines added with said new line.

2. A memory control method of a character multiplexed broadcast receiver recited in claim 1; wherein, in each of said plurality of lines is registered information comprising a program number and a page number of data stored in one of said plurality of blocks in addition to a block number of said each of said plurality of blocks.

3. A memory control method of a character multiplexed broadcast receiver recited in claim 1; wherein, each of said plurality of blocks has a memory space of $2_n$ bytes, n being a positive integer.

4. A memory control method of a character multiplexed broadcast receiver recited in claim 1; wherein, each of said plurality of blocks has a memory space of 128 bytes.

5. A memory control method of a character multiplexed broadcast receiver recited in claim 1; wherein, said status bit table comprises m upper bit sequence(s) further to said basic bit sequence, m being a positive integer:

logic of each bit of a first of said m upper bit sequence(s) indicating logical product of logic of each bit of each of words of said basic bit sequence for retrieving a word having a bit of logic '0' of said basic bit sequence indicating available one of said plurality of blocks; and logic of each bit of each (i+1)-th of said m upper bit sequence(s) indicating logical product of logic of each bit in each of words of corresponding i-th of said m upper bit sequence(s) for retrieving a word having a bit of logic '0' of said i-th of said m upper bit sequence(s), i being a positive integer smaller than m.

6. A memory control method of a character multiplexed broadcast receiver recited in claim 1; wherein, said status bit table comprises an upper bit sequence further to said basic bit sequence: logic of each bit of said upper bit sequence indicating logical product of logic of each bit of each of words of said basic bit sequence for retrieving a word having a bit of logic '0' of said basic bit sequence indicating available one of said plurality of blocks.

* * * * *

UNITED STATES PATENT AND TRADEMARK OFFICE

CERTIFICATE OF CORRECTION

PATENT NO. : 5,815,170

DATED : September 29, 1998

INVENTOR(S) : Tsuyoshi Kimura, et al.

It is certified that error appears in the above-identified patent and that said Letters Patent is hereby corrected as shown below:

Column 9, Line 28, : Claim 3: "2n" should read --2--.

In the Drawings, Sheet 9 of 11: "Routin" should read --Routine--

In the Drawings, Sheet 3 of 11, Figure 3: "Resistration" should read --Registration--

Figure 10:
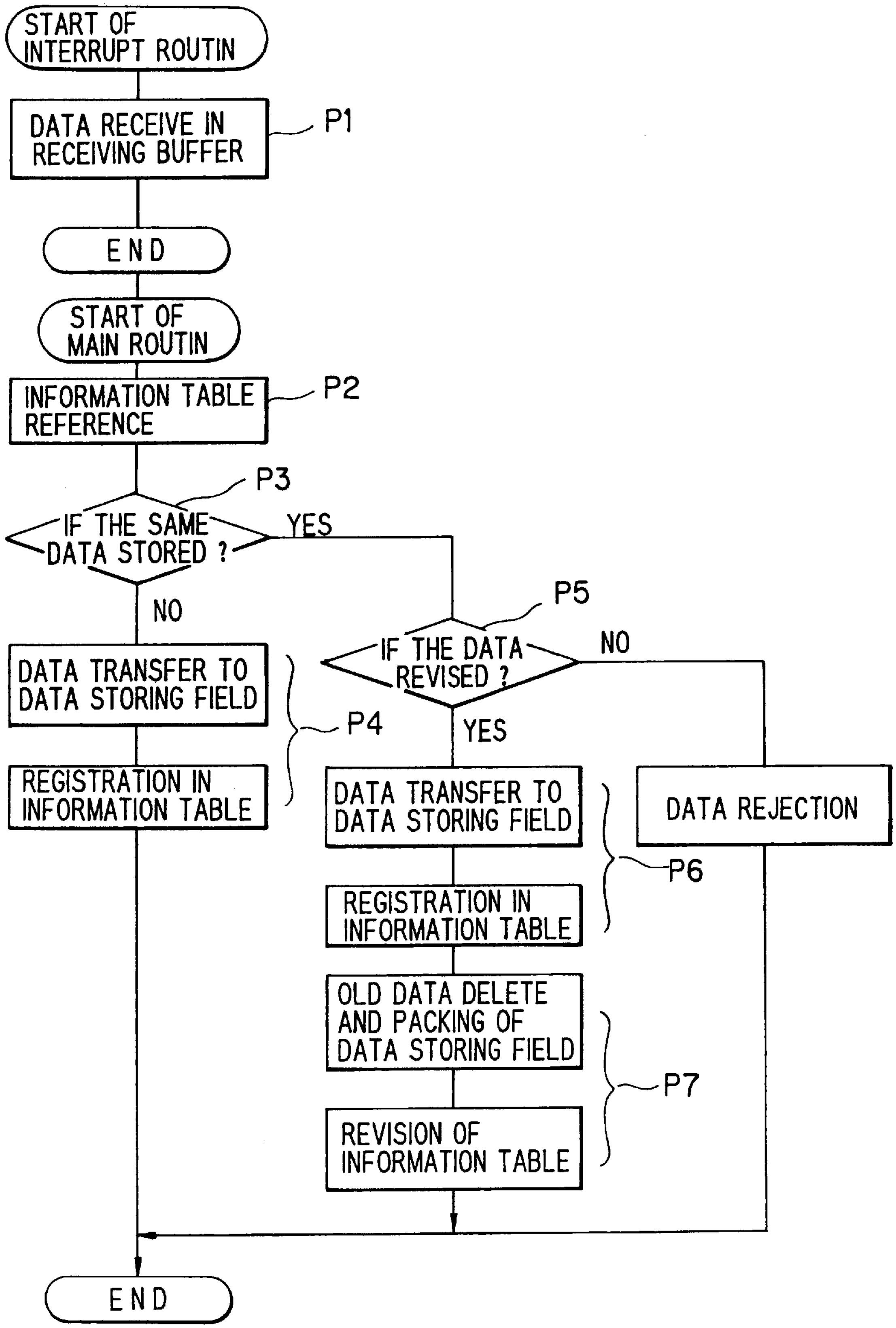
FIG. 10 PRIOR ART
FIG. 10 is a flowchart illustrating processing steps of the prior art of FIG. 9.
Figure 11:
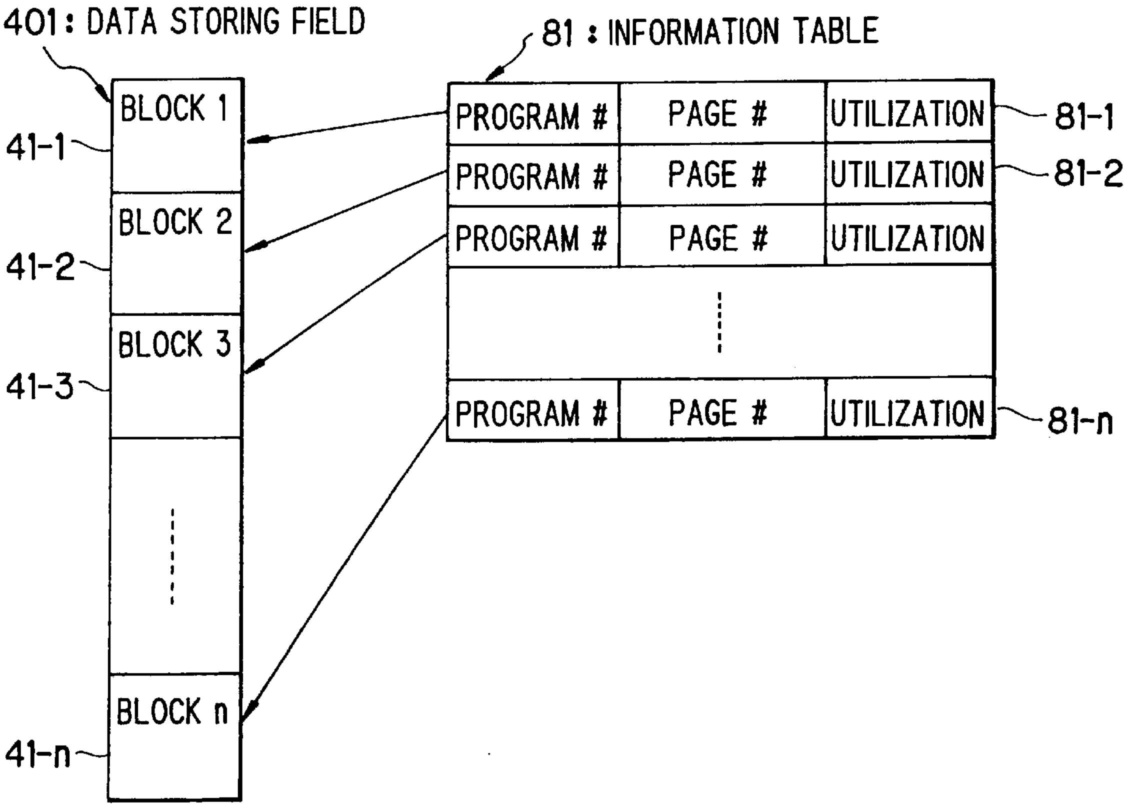
FIG. 11 PRIOR ART
FIG. 11 is a block diagram illustrating memory structure of a still another prior art.
Figure 12:
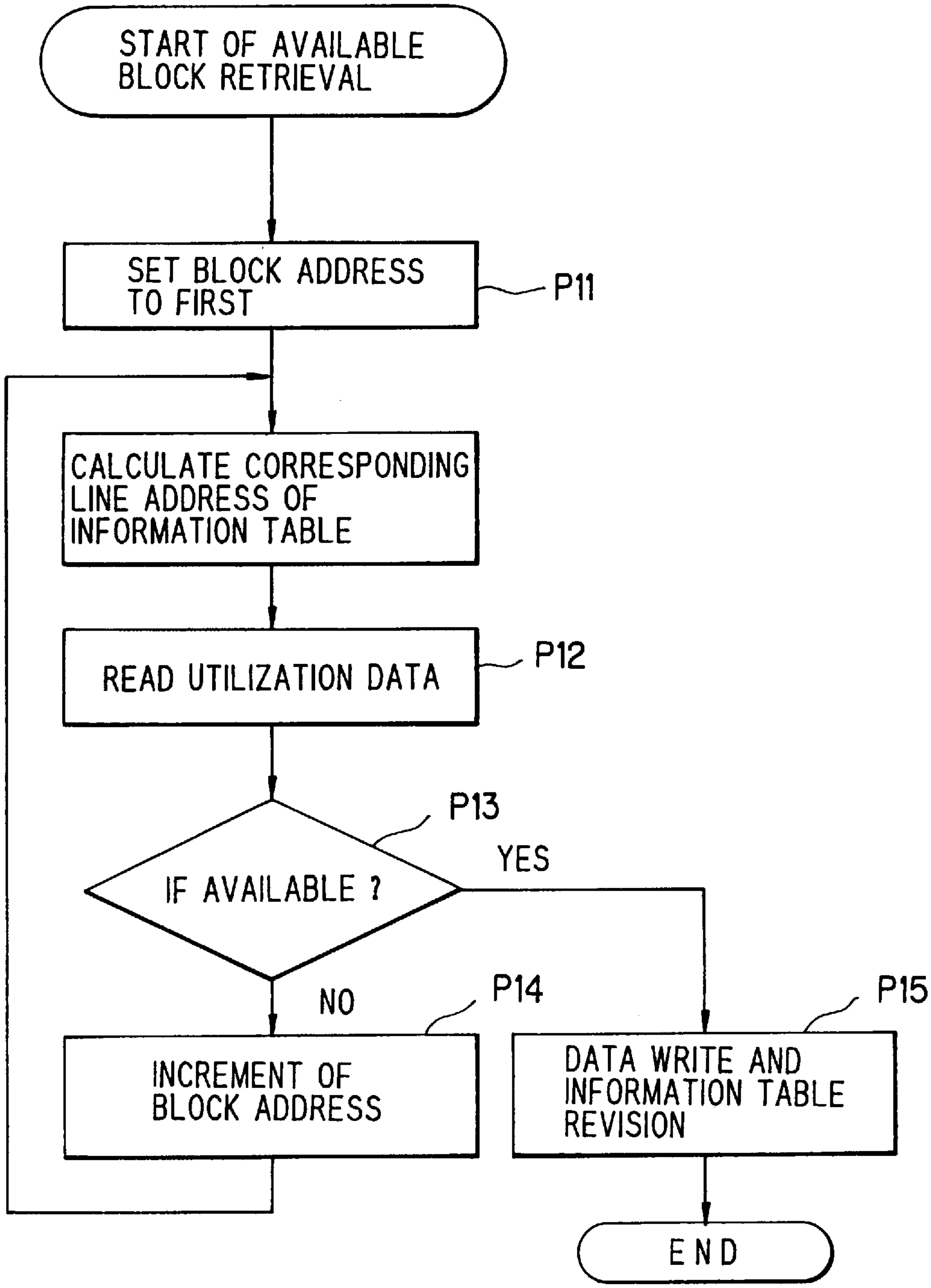
FIG. 12 PRIOR ART
FIG. 12 is a flowchart illustrating memory control processes of the prior art of FIG. 11.

In the Drawings, Sheet 9 of 11, Figure 10: "Routin" should read --Routine--

Signed and Sealed this

Fifth Day of September, 2000

*Attest:*

Q. TODD DICKINSON

*Attesting Officer*

*Director of Patents and Trademarks*